United States Patent [19]
Long, Jr. et al.

[11] Patent Number: 5,248,419
[45] Date of Patent: * Sep. 28, 1993

[54] SEWAGE SLUDGE TREATMENT WITH GAS INJECTION

[75] Inventors: Charles A. Long, Jr., Birmingham, Ala.; Robert D. Blythe, Bethesda, Md.; William A. Cobb; Philip M. Grover, both of Birmingham, Ala.

[73] Assignee: Long Enterprises, Birmingham, Ala.

[*] Notice: The portion of the term of this patent subsequent to Jun. 26, 2007 has been disclaimed.

[21] Appl. No.: 929,659

[22] Filed: Aug. 12, 1992

Related U.S. Application Data

[60] Division of Ser. No. 539,112, Jun. 15, 1990, Pat. No. 5,147,563, which is a continuation-in-part of Ser. No. 402,276, Sep. 1, 1989, Pat. No. 4,936,983.

[51] Int. Cl.⁵ .............................................. C02F 11/06
[52] U.S. Cl. .................................... 210/218; 210/219; 261/89
[58] Field of Search ............... 210/208, 197, 218-220, 210/244, 670, 752, 758, 760, 764; 261/84, 87-89

[56] References Cited

U.S. PATENT DOCUMENTS

| | | | |
|---|---|---|---|
| 3,650,950 | 3/1972 | White | 210/197 |
| 3,772,188 | 11/1973 | Edwards | 210/197 |
| 4,021,349 | 5/1977 | Kaelin | 210/219 |
| 4,412,003 | 10/1983 | Evans | 210/218 |
| 4,487,699 | 12/1984 | Long, Jr. | 210/760 |
| 4,582,612 | 4/1986 | Long, Jr. | 210/760 |
| 4,652,382 | 3/1987 | Edwards, Jr. et al. | 210/219 |
| 4,659,464 | 4/1987 | Long, Jr. | 210/760 |
| 4,695,388 | 9/1987 | Long, Jr. | 210/760 |
| 4,936,983 | 6/1990 | Long, Jr. et al. | 210/218 |

Primary Examiner—Thomas Wyse
Attorney, Agent, or Firm—Panitch Schwarze Jacobs & Nadel

[57] ABSTRACT

This invention relates to a sewage sludge treatment system resulting in an oxygenated and/or ozonated treated sludge containing substantially no pathogens. The system includes apparatus and a process for mascerating raw sludge, adjusting the pH to about 2.5 to about 3, adjusting the solids content to about 2.5% to about 4%, adjusting the temperature, if necessary, to about 20° C. to about 40° C., mixing an oxygen-rich gas, such as oxygen and/or ozone with the sludge as the sludge is mixed or recirculated through a hyperbaric vessel and simultaneously injecting the oxygen-rich gas into a combination gas and sludge mixing and dispersing assembly in an upper portion of the hyperbaric vessel. Such injection causes mixing of the gas and sludge and dispersement of such mixture in a plurality of streams to atomize and oxygenate the sludge.

7 Claims, 6 Drawing Sheets

SEWAGE SLUDGE TREATMENT WITH GAS INJECTION

CROSS-REFERENCE TO RELATED APPLICATIONS

This application is a division of application Ser. No. 07/539,112, filed Jun. 15, 1990, now U.S. Pat. No. 5,147,563, which was a continuation-in-part of application Ser. No. 07/402,276, filed Sep. 1, 1989, now U.S. Pat. No. 4,936,983.

BACKGROUND OF THE INVENTION

This invention relates to apparatus for treating sewage sludge in a hyperbaric vessel in which the sludge is oxygenated by injecting an oxygen-rich gas into the sewage sludge and then dispersing the mixture of sludge and oxygen-rich gas into the upper portion of a hyperbaric vessel for further interaction with an oxygen-rich atmosphere.

Traditionally, sewage, and specifically sludge, has been difficult to treat because it is, almost by definition, extremely variable in composition. In addition to human liquid and solid organic waste, the sludge to be treated in accordance with the present invention may include industrial and commercial sludge which is susceptible to aerobic treatment. In general, the present invention provides a means and process for highly efficient interaction of sludge particles with an oxygen-rich gas, in the form of $O_2$ gas (oxygen) and/or $O_3$ gas (ozone).

The present invention is intended primarily for treatment of activated sludge, namely, waste from domestic, commercial and industrial sources which create a biologically degradable material. A batch of pH adjusted waste to be treated is mixed with an oxygen-rich gas, the mixture is divided into small droplets and the droplets are dispersed within a pressure vessel where they are oxygenated by being exposed to an oxygen-rich gas for a substantial period of time. The Biological Oxygen Demand (BOD) and the Chemical Oxygen Demand (COD) of the waste are substantially saturated and satisfied. The addition of ozone produces an almost complete destruction and elimination of coliform, fecal coliform, salmonella and other harmful bacteria from the batch of sludge being treated. Although the coliform and fecal coliform bacteria are not in themselves particularly harmful, when they are present, it is recognized that other harmful bacteria are present. Thus, when the coliform and fecal coliform bacteria are destroyed, it is an indication that the other harmful bacteria, which are more difficult to detect, are also destroyed.

The present invention is intended to be used in a large scale sewage treatment system for treating activated sludge which is generally too thick to be treated efficiently on a large scale basis by presently existing commercial equipment. The present invention can be incorporated with presently existing wastewater treatment plants. Most existing wastewater treatment plants are capable of producing sludge with a solid content of about one and one-half percent by weight. The present invention has been designed to treat sludge having a solid content of greater than two percent to about four percent by weight, more preferably from about three percent to about three and one-half percent.

Various prior art references have dealt with treating sewage or water by aeration, oxidation or ozonation, as well as with dispersement in hyperbaric vessels. None, however, has all of the features of the present invention.

One of the co-inventors of the present invention developed a series of improved sludge treatment systems as illustrated, described and claimed in U.S. Pat. Nos. 4,487,699, 4,582,612, 4,659,464 and 4,695,388 of Charles A. Long, Jr., the disclosures of which are hereby incorporated by reference. While the sludge treating systems, processes and apparatus disclosed in the foregoing Long, Jr. patents enhanced the treatment of sludge compared to the systems, processes and apparatus previously known for that purpose, the present inventors devised a way to still further enhance the treatment of sewage sludge to reduce the bacteria, as well as viruses, parasites and other pathogens in the treated sludge to below currently detectable levels in a relatively short time and in an efficient manner.

Another aspect of the present invention relates to the further handling of the treated sludge product which will be less objectionable to the public. The sludge product treated according to the present invention has substantially reduced pathogens than prior art sludges. Moreover, the treated sludges used to make a sludge cake which can be hauled to a landfill, or otherwise used or processed into a product which does not produce such a foul odor that the such products would be objectionable to the public.

SUMMARY OF THE INVENTION

One aspect of the present invention is an apparatus for use in a sewage sludge treatment system comprising means to enhance the treatment of the sludge with oxygen-rich gas including a hyperbaric vessel having sludge inlet means for conveying the sludge to the vessel to be accumulated in a lower portion thereof, a combination mixing and dispersing means having a plurality of channels and supported within an upper portion of the vessel for mixing the sludge and oxygen-rich gas and for dispersing a mixture of sludge and oxygen-rich gas throughout the upper portion of the vessel in a plurality of streams, a sludge delivery means comprising a pump associated with a conduit, the conduit being attached to the combination mixing and dispersing means for delivering sludge from the bottom portion of the vessel to the combination mixing and dispersing means, a first gas delivery means for delivering oxygen-rich gas to the combination mixing and dispersing means, including a first oxygen-rich gas inlet for delivering gas directly to the combination mixing and dispersing means, a sludge mixing means comprising a conduit connected at opposite ends to the hyperbaric vessel and a pump externally of the hyperbaric vessel for pumping the mixture of sludge and oxygen-rich gas out of and back into the hyperbaric vessel, a second gas delivery means including a second oxygen-rich gas inlet for delivering oxygen-rich gas to one of the sludge delivery means and the sludge mixing means for additionally adding oxygen-rich gas to the sludge, a sludge outlet means for removing the oxygenated sludge from the lower portion of the vessel, and gas outlet means for removing gas from the upper portion of the vessel.

Another aspect of the present invention is a process for treating sewage sludge comprising (a) mascerating the raw sludge obtained from a sewage treatment facility, (b) adjusting the pH of the mascerated sludge to a pH of about 2.5 to about 3, (c) adjusting the solids content of the sludge to about 2.5% to about 3.5% by weight, (d) adjusting the temperature of the sludge to about 20° C. to about 40° C., (e) mixing an oxygen-rich gas selected from the group consisting of oxygen, ozone and mixtures thereof with the sludge as the sludge is mixed or recirculated through a hyperbaric vessel having an upper portion wherein the pressure of the oxygen-rich gas is maintained at a pressure of about 45 psig to about 60 psig, (f) simultaneously injecting the oxygen-rich gas into a combination gas and sludge mixing and dispersing means by which the oxygen-rich gas is mixed with the sludge and the combination of the gas and sludge are dispersed throughout the upper portion of the hyperbaric vessel in a plurality of streams in a manner to atomize and oxygenate the sludge, and (g) continuing steps (e) and (f) for a time sufficient to produce a treated sludge having an amount of bacteria not greater than minimum governmental standards.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE PREFERRED EMBODIMENTS

Figure 1:
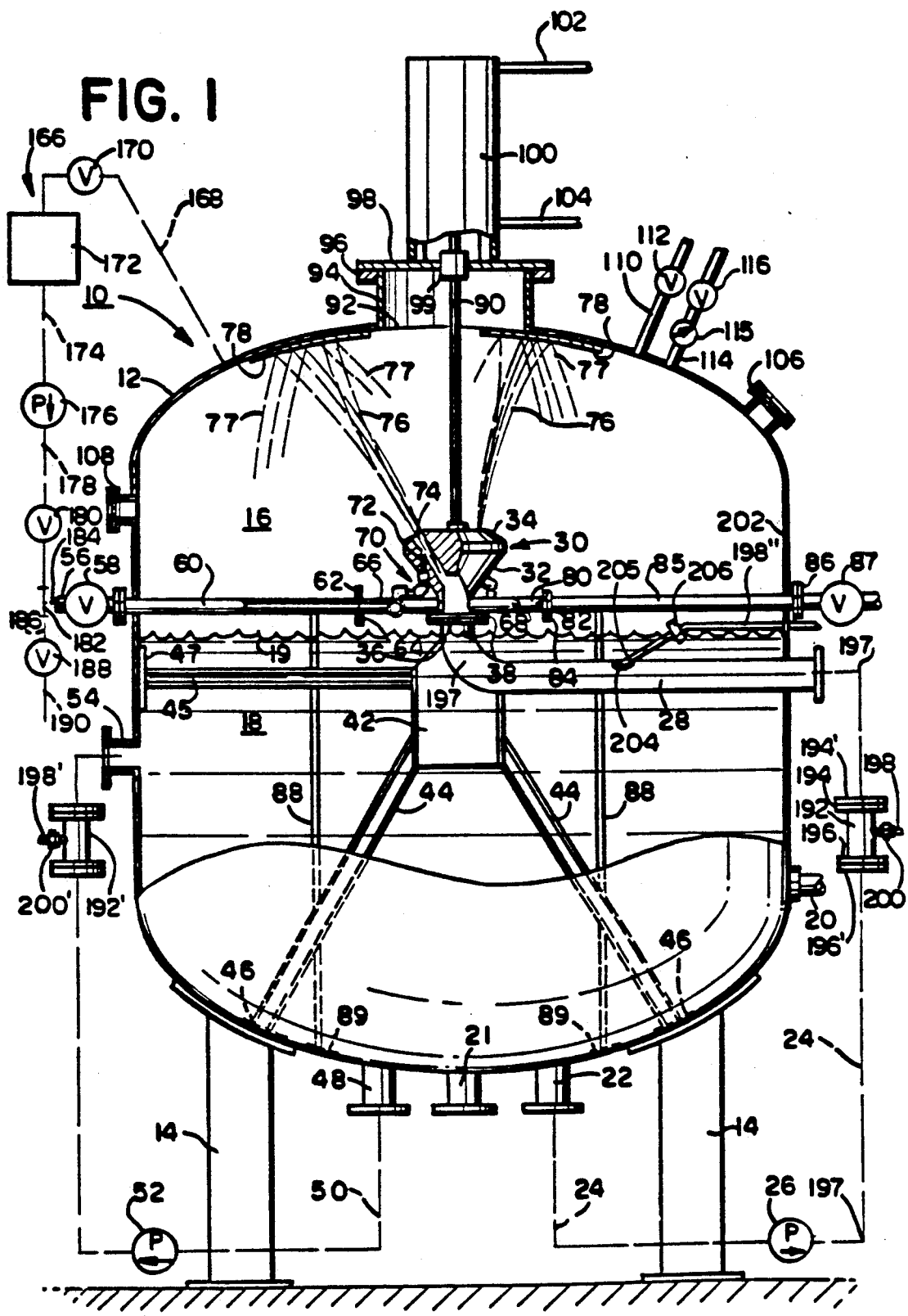
FIG. 1 is a vertical cross-sectional view, partly in side elevation, of a reactor assembly and related components in accordance with the present invention.

Prior to describing the individual components of the present invention and the various systems such components comprise, a generalized overview of the systems will be described.

By initially injecting oxygen or ozone gas into the sludge prior to dispersing the sludge in the form of several streams of divided drops, droplets or particles in a pressurized, oxygen-rich atmosphere through a plurality of channels formed in a combination gas and sludge mixing and dispersing means, more efficient and complete bacterial kill, oxygenation and activation of the sludge is obtained. The initial contact of the sludge with the pressurized oxygen-rich gas, and particularly ozone, into the separated stream of sludge within channels of a combination gas and sludge mixing and dispersing assembly creates an intimate, immediate contact of a relatively high concentration of the oxygen-rich gas with the sludge to enhance the oxidation of the sludge. Oxygenation and/or ozonation is further enhanced by also injecting the oxygen-rich gas in a recirculation conduit or in a mixing conduit as described hereinafter. When the mixture is dispersed in the form of droplets or the like from the combination mixing and dispersing apparatus in a plurality of streams into the upper portion for interaction with the pressurized oxygen-rich gas, the previously oxygenated sludge is even further activated as the sludge is dispersed throughout the upper portion of the hyperbaric vessel.

The effect of the injection of pressurized oxygen and/or ozone into a plurality of channels produces an atomizing effect which changes the physical characteristic of the sludge into a mixture of very fine size particles. The continuation of this injection process with mixing provided by an additional constant mixing means, and preferably with further addition of oxygen-rich gas over a period of about thirty minutes to about one and one-half hours generally assures that the processed product will be oxygen and ozone saturated. The processed product will also be completely atomized and will have a pH of about 3 to about 3.5.

The product that will be discharged into a rapid separation vessel in a manner as described in U.S. Pat. No. 4,695,388, is heated, composed of very fine particles, saturated with oxygen and ozone and generally has a pH of about 3 to about 3.5. This new sludge product now possesses changed physical and chemical characteristics that provide the means for further treatment of the new sludge product on an economical basis.

The new sludge product can be further treated by adding chemicals, such as sodium nitrite ($NaNO_2$), that will produce a further and broader spectrum pathogen kill, for example, bacteria, parasites, such as Ascaris eggs, and particularly viruses. The fine particle size, raised temperature and depressed pH of the new sludge product greatly increases the pathogen kill effectiveness of this chemical addition, such that less chemical can be used and less contact time of the chemical with the sludge is required. Thus, a far smaller amount of chemical additive and retention time will be required than would be required to produce a generally equivalent pathogen and parasite kill in sludge that was not injected with pressurized oxygen and/or ozone.

The very fine size particles of the new sludge product provide the means for greater dewaterability using a commercially available dewatering device, such as a belt press or a centrifugal dewatering machine. Since the new sludge product is safely deodorized and is free from putrescent odors, the dewatering operation can be accomplished in a pleasant environment.

After the rapid separation stage and further pathogen kill by chemical treatment, the resulting new sludge product will have a solids concentration of between about 5% and about 8%. This treated sludge product can be directly applied to benefit soils as a liquid material, for example, as a fertilizer. The significant and further pathogen kill and lack of putrescent odors permits the safe and nuisance-free utilization of the new sludge product in this way.

Sludge processed according to the present invention has been found to meet the standards of a sludge produced by a Process To Significantly Reduce Pathogens (PSRP) by the United States Environmental Protection Agency. By meeting such standards, the treated sludge may be used on permitted farm sites and landfills. It is believed that the sludge will also meet United States Environmental Protection Agency standards for sludge produced by a Process To Further Reduce Pathogens (PFRP), a more stringent standard which allows the use of such sludge in broader applications, such as in general landscaping work, in public parks and golf courses, for example.

Now referring to the drawings in detail, wherein like numerals indicate like elements throughout the several views, there is shown in FIG. 1 a reactor assembly 10 including related components in accordance with the present invention. Reactor assembly 10 comprises a hyperbaric vessel 12 supported above a foundation of any suitable type and strength by a plurality of support members 14. Although the vessel 12 is typically of such size that it is best adapted to be mounted in a stationary manner as part of a stationary sewage treatment system, if desired, vessel 12 may be mounted on a trailer or other transport device by which it may be transported to various locations to be connected to other components of a sewage treatment system. Although vessel 12 may be of any desired size, it is preferred that it be capable of handling a large volume of sludge and would have typical dimensions of about 12 feet in diameter and about 16 feet in height. Although the vessel is generally illustrated as being generally cylindrical with rounded edges where the sides meet the top and bottom walls, it may have other shapes, if desired. The vessel should be able to withstand pressures of at least about six atmospheres, since the vessel will be operated primarily under hyperbaric conditions, that is, above atmospheric pressure. The material used to make the vessel should be durable, as well as easy to maintain and non-reactive with the acidified sludge environment. A suitable material would be stainless steel, for example.

Vessel 12 has an upper portion 16 and a lower portion 18. Lower portion 18 includes any portion of the vessel containing sludge and is not limited to any particular volume of sludge within the vessel. It is important that there be an upper portion 16 located above the level of sludge 19 and above the level of a sludge mixing inlet 54. Accordingly, upper portion 16 of the vessel is not defined by any specific volume but should be sufficient to contain the combination gas and sludge mixing and dispersing assembly 30 and have sufficient volume to allow substantially complete interaction between the dispersed sludge and oxygen-rich gas in the upper portion.

Sludge, preferably having its pH adjusted to about 2.5 to about 3 and its temperature modified to between about 20° C. and about 40° C., is pumped into lower portion 18 of vessel 12 through a sludge inlet 20. When the sludge is fully oxygenated, the sludge exits vessel 12 through a sludge outlet 21. Sludge inlet 20 and outlet 21 may be connected to valved conduits where the valves are operated by remote control as is well known to those skilled in the art.

Sludge is delivered from lower portion 18 to upper portion 16 of vessel 12 by a sludge delivery means. The sludge delivery means comprises a sludge recirculating outlet 22 attached in a suitable manner, such as by a flanged connection, to a sludge recirculating conduit 24. A pump 26, such as a hydraulically driven pump, pumps sludge through conduit 24 into a sludge delivery conduit 28 which is attached as set forth hereinafter to the combination gas and sludge mixing and dispersing assembly 30.

A static mixer device 192, such as an aspirator, is inserted into sludge recirculation conduit 24 via flanges 194 and 196 formed on device 192 which are fastened to companion flanges 194' and 196', respectively, formed on portions of conduit 24 using bolts and gaskets (not shown). An oxygen-rich gas, preferably ozone, is piped into device 192 by an ozone inlet pipe 198 having a threaded end which is connected to static mixer device 192 using a threaded pipe union 200. Static mixer device 192 is sized to match sludge flow with oxygen/ozone flow to maximize ozone transfer. Static mixer device 192 is preferably inserted into a straight section of conduit 24 as far away from bends 197 as possible. This embodiment of the ozone injection assures that the ozone will be injected into the circulating sludge at a point where the flow of the circulating sludge has a generally laminar flow resulting in a minimum amount of turbulence in the flow of the circulating sludge.

In an alternate embodiment of the present invention, a static mixer device 192' which preferably is of the same type as device 192, is inserted into sludge mixing conduit 50 in the same manner as just described with respect to static mixing device 192 inserted into sludge recirculation conduit 24. In this alternate embodiment, an oxygen-rich gas, preferably ozone, is piped into device 192' by a threaded inlet pipe 198' and threaded union 200'.

In a further alternate embodiment of the present invention, an ozone inlet pipe 198" extends through and is welded to a wall 202 of hyperbaric vessel 12 and is connected to sludge delivery conduit 28 using a threaded weld saddle 204 and a union 206 with an appropriate hole having been previously drilled into sludge delivery conduit 28. Ozone inlet pipe 198" preferably enters sludge delivery conduit 28 at an angle of approximately 30° to the horizontal. The angle of this injection point will cause the stream of ozone to cause a slight turbulence in the flow of circulating sludge in sludge delivery conduit 28.

FIG. 1 illustrates all of the embodiments in which alternate ozone inlet pipes 198, 198' and 198" are used in alternate embodiments of the present invention merely for the sake of convenience. The use of all arrangements including ozone inlet pipes 198, 198' and 198" may be redundant and unnecessary. Thus, as a practical matter, only one of the three alternate embodiments would be used.

Figure 2:
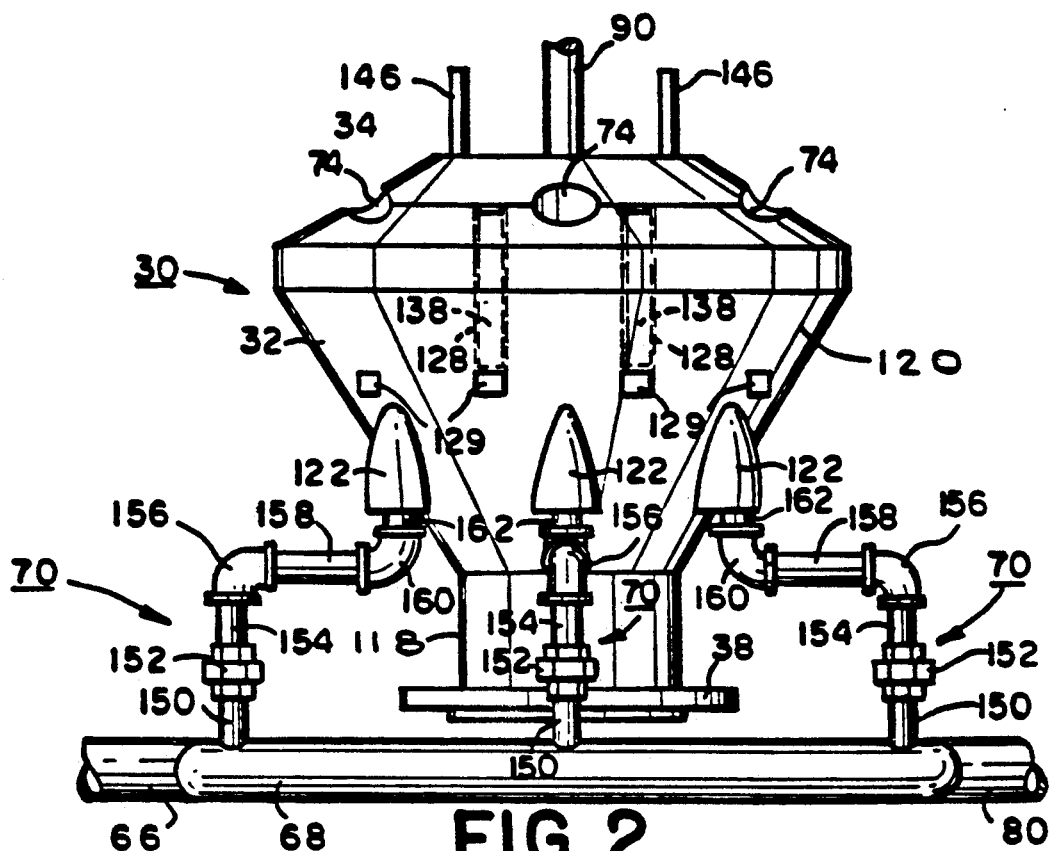
FIG. 2 is a side elevation view of a combination gas and sludge mixing and distributing assembly which is one of the components of the reactor assembly showing its connection to the oxygen-rich gas delivery means.
Figure 4:
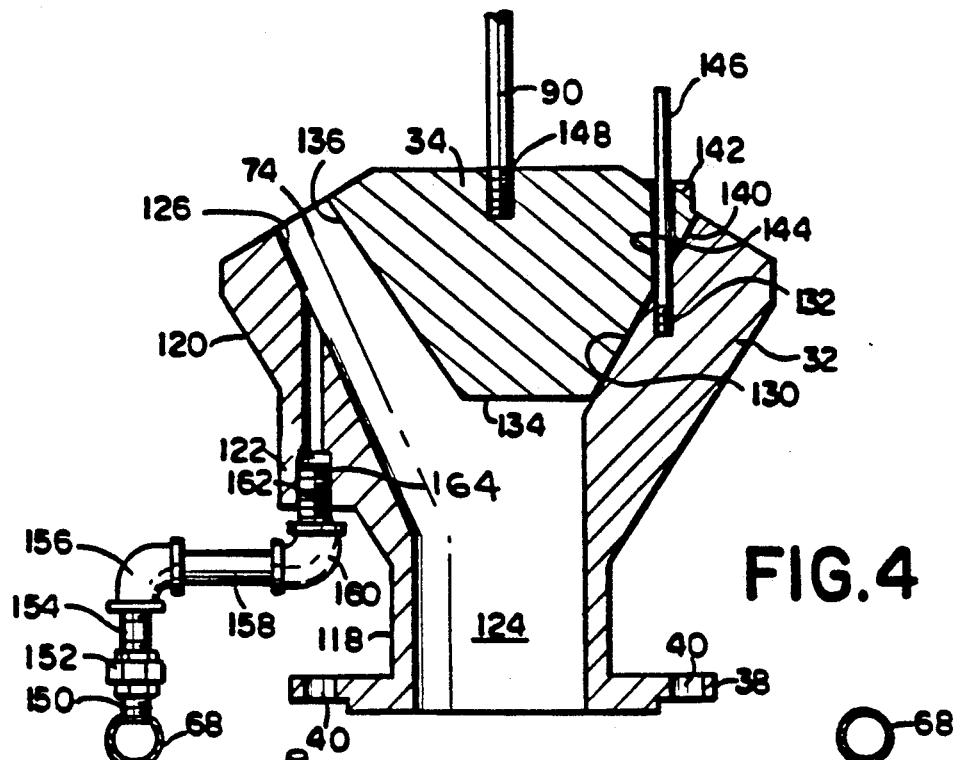
FIG. 4 is a vertical cross-sectional view, partly in elevation, taken along lines 4—4 of FIG. 3.
Figure 5:
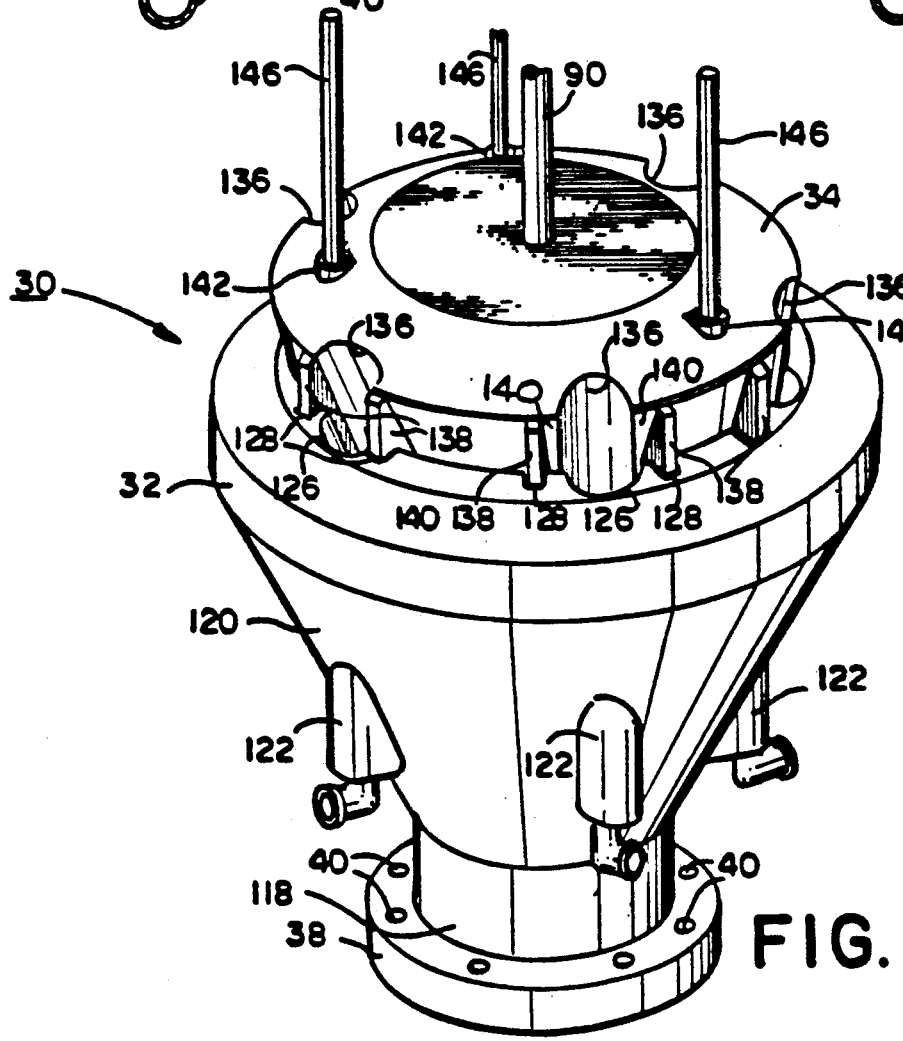
FIG. 5 is a perspective view of the combination gas and sludge mixing and dispersing assembly showing the construction of the assembly having an interrelationship between a first, lower section or subassembly and a second, upper section or subassembly, in which the second section is raised with respect to the first section.

As best illustrated in FIGS. 2 and 5, combination mixing and dispersing assembly 30 comprises a first, lower section of subassembly 32 and a second, upper section or subassembly 34. Sludge delivery conduit 28 includes a flange 36 (FIG. 1) which is attached to a mating flange 38 (FIGS. 2, 4 and 5) by bolts (not shown) extending through holes 40 in the flanges.

Combination mixing and dispersing assembly 30 is supported within upper portions 16 of vessel 12 by a support assembly 42 supported by a plurality of legs 44 fastened in any conventional manner, such as by welding or with fasteners, to support plates 46 attached to the bottom wall of the vessel. A plurality of substantially horizontal supports 45 attached in a like manner to support plates 47 are also used to support the support assembly 42 as illustrated in FIG. 1.

To obtain efficient oxygenation of the sludge within vessel 12, the sludge is mixed substantially continuously.

A suitable mixing means comprises a sludge mixing outlet 48 attached to a conduit 50. A pump 52, such as an electrically driven pump, pumps the sludge through conduit 50 into sludge mixing inlet 54 located in the lower portion of vessel 12.

Oxygen-rich gas, which may be oxygen or ozone, but preferably is a mixture of both oxygen and ozone, enters reactor vessel 12 through an inlet conduit 56 which may be controlled by a suitable remote controlled valve 58. Conduit 56 is connected to an internal gas inlet conduit 60 which in turn is connected by a flange 62 to a flange 64 of a connecting conduit 66. Connecting conduit 66 in turn is connected to a manifold 68, best illustrated in FIGS. 2 and 3.

Referring further to FIG. 1, the following components comprise an oxygen-rich gas recirculation loop 166. A gas recirculation conduit 168 is connected in fluid communication with upper portion 16 of hyperbaric vessel 12. The gas flows from upper portion 16 of hyperbaric vessel 12 through a flow control valve 170 and into a gas drying facility 172. The gas drying facility may be of any suitable construction as is well known to those skilled in the art and which is commercially available. Gas drying facility 172 is connected to a gas pump 176 by means of a conduit 174. Gas is pumped through a valve 180 in a conduit 178, which is connected to a T-connection 182. The T-connection 182 is also connected to inlet conduit 56 by means of a conduit 184. Alternatively, T-connection 182 can be connected directly to inlet conduit 56. The T-connection 182 is also connected to a valve 188 by means of a conduit 186. Valve 188 is connected to a source (not shown) of oxygen and/or ozone by means of a conduit 190.

Gas manifold 68 is connected by a plurality of fittings 70 to the first, lower section 32 of the combination gas and sludge mixing and dispersing assembly 30 in a manner described in more detail hereinafter. Each fitting is connected to be in gas communication between manifold 68 and a bore 72 formed in first section 32 which in turn communicates with one of a plurality of channels 74 formed between first, lower section 32 and second, upper section 34 of the combination mixing and dispersing assembly. When oxygen-rich gas and sludge are pumped into combination gas and sludge mixing and dispersing assembly 30, the mixture of gas and sludge is dispersed from the mixing and dispersing assembly through the plurality of channels 74 in a plurality of streams of mixed oxygenated sludge 76. Sludge streams 76 are directed against a plurality of target areas preferably radially formed around the top wall of vessel 12. A plurality of target plates 78 may be secured to the inside of the top wall of the vessel by welding, for example. Sludge streams 76 impact with target plates 78 to form great numbers of sludge droplets 77 which are dispersed throughout upper portion 16 of hyperbaric vessel 12. By dispersing pre-oxygenated sludge throughout upper portion 16 of vessel 12, very efficient and substantially complete interaction of the oxygen-rich gas and sludge for reducing pathogen organisms occurs over a relatively short period of time.

To allow purging of manifold 68 to remove solid or liquid particles which may settle in the manifold, a purging means is associated with the manifold. The purging means comprises a connecting conduit 80 connected to manifold 68, preferably at a location opposite that of the gas inlet connecting conduit 66. Conduit 80 is attached by a flange 82 to a flange 84 of an internal gas purging conduit 85 which in turn is connected to an external gas purging conduit 86. A remote controlled valve 87 is used to control the purging of the contaminated oxygen-rich gas from manifold 68 through external conduit 86.

Manifold 68 is supported by fittings 70 to combination mixing and dispersing assembly 30 which is supported within vessel 12 as described above. Additional support for the oxygen-rich gas delivery and purging components may be provided, if desired, by legs 88 attached at one end to conduits 60 and 80, for example, and at the other end to support plates 89 supported on the inside of the bottom wall of vessel 12, all as illustrated in FIG. 1.

A shaft 90 is attached to the second, upper section 34 of combination mixing and dispersing assembly 30 to raise and lower the second section with respect to the stationary first section 32. As illustrated in FIG. 1, shaft 90 passes through manhole opening 92. Surrounding the manhole opening is a raised neck 94 having a flange 96 to which is attached a cover 98 using a gasket (not shown). A packing gland 99 or other suitable device for maintaining pressure within hyperbaric vessel 12 is associated with cover 98 surrounding shaft 90. The opposite end of shaft 90 which is not connected to the second section of the mixing and dispersing assembly is connected to a piston (not shown) within a hydraulic cylinder 100 mounted on cover 98. Hydraulic lines 102 and 104 connected to a suitable source of hydraulic fluid (not shown) control the raising and lowering of shaft 90 and second section 34 with respect to first section 32 of combined mixing and dispersing assembly 30.

If desired, a plurality of sight glasses or viewing ports 106 and 108, for example, may be included around vessel 12. The viewing ports may be illuminated as desired in a manner well known to those skilled in the art and may be located both in the upper portion and lower portion of the vessel.

A conduit 110 having a valve 112, representative of a gas outlet or bleed valve, may be located in the upper portion of the vessel, preferably in a top wall thereof. Likewise, a conduit 114 including a pressure sensor 115 and/or a safety pressure relief valve 116 also may be located in the upper portion of the vessel, and preferably at the top wall thereof.

The novel gas and sludge mixing and dispersing assembly 30 and related components will now be described in more detail with reference to FIGS. 2 through 7. As indicated above, combination mixing and dispersing assembly 30 comprises a first, lower section 32 and a second, upper section 34. First section 32 is best illustrated in FIGS. 2, 4, 5 and 6. First section 32 includes a generally cylindrical lower portion 118 integrally formed with an upper, inverted conical portion 120. First section 32 preferably is machined or cast from a single piece of material, such as stainless steel or other material which can withstand the acidic, corrosive environment within the vessel. A plurality of raised bosses 122, for example, five in the presently preferred embodiment, are arranged radially and equiangularly around the first section, toward the bottom of inverted conical portion 120.

A central bore 124 extends axially through both portions 118 and 120 of first section 32, as best illustrated in FIG. 4. A plurality of angled, generally semicircular lower channel halves 126 extend radially around first section 32. Lower channel halves 126 are best illustrated in the top plan view of FIG. 6 as having a larger cross-section where they join with the central bore 124 and a smaller cross-section at their opposite, upper end where they join with each of a plurality of upper channel halves 136 to form a nozzle or opening through which a mixture of oxygen-rich gas and sludge is dispersed in the form of a stream of droplets from assembly 30.

First, lower section 32 also includes a plurality of vertical V-shaped guideways 128 radially arranged around section 32 between adjacent channel halves 126. Because of the inverted conical shape of portion 120, guideways 128 may extend to and through the outside wall forming openings 129 as best illustrated in FIG. 2. The purpose of guideways 128 will become clear below after the structure of second, upper section 34 is described.

Figure 6:
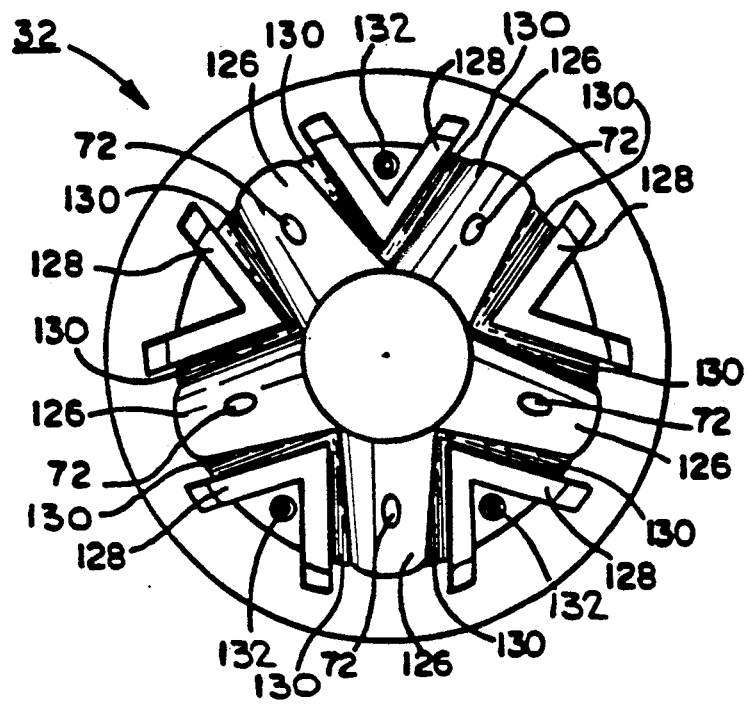
FIG. 6 is a top plan view of the first, lower section of the combination gas and sludge mixing and dispersing assembly.
Figure 7:
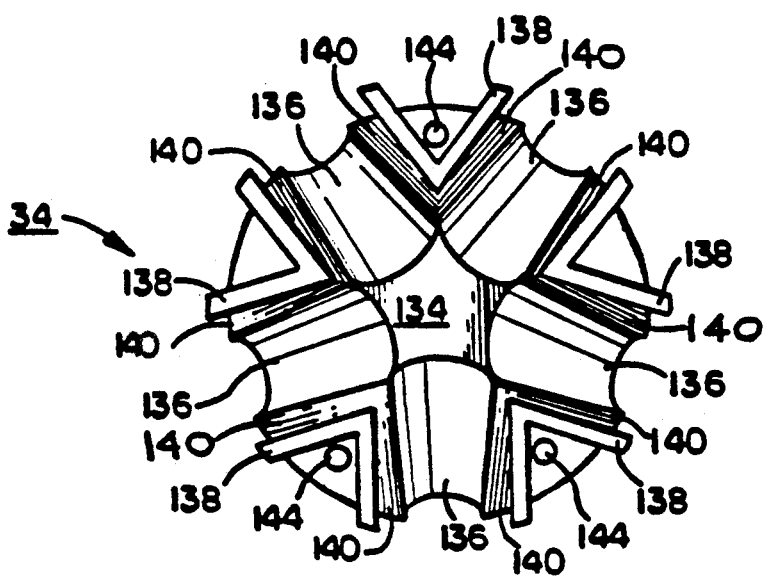
FIG. 7 is a bottom plan view of the second, upper section of the combination gas and sludge mixing and dispersing assembly.

As best illustrated in FIGS. 4 and 6, bores 72 join corresponding lower channel halves 126 so that the oxygen-rich gas from each of the bores 72 mixes intimately with the sludge from each of the channels 74. Bore 72 meets channel 74 at an oblique angle as best illustrated in FIG. 4. In view of this arrangement, the pressurized gas efficiently mixes with the sludge in the channel and helps propel the mixture of gas and sludge from mixing and dispersing assembly 30.

First section 32 also includes a plurality of machined, cast surfaces 130 which extend between lower channel halves 126 and guideways 128. Surfaces 130 mate with and adjoin complementary surfaces formed on second section 34. Additionally, a plurality of bores 132, preferably threaded, are formed in first section 32 to retain vertical guide rods 146 (see FIG. 4) in a manner and for the purpose referred to hereinafter.

Second, upper section 34 will now be described in more detail with particular reference to FIGS. 2 through 5 and 7. As best seen in FIG. 4 and in FIG. 7, a bottom plan view of section 34, the section is in the shape of an inverted cone and includes a bottom wall 134 which is illustrated as being flat (FIG. 4). If desired, bottom wall 134 could be tapered to a point or a flat or curved truncated point to provide a smoother flow of sludge through the combination mixing and dispersing assembly 30.

A plurality of upper channel halves 136 radially arranged around section 34 have a larger cross-sectional dimension at their lower end where they join with central bore 124 and a smaller cross-sectional dimension at their upper end where they cooperate with lower channel halves 126 to form a plurality of outlets or nozzles for channels 74.

Figure 3:
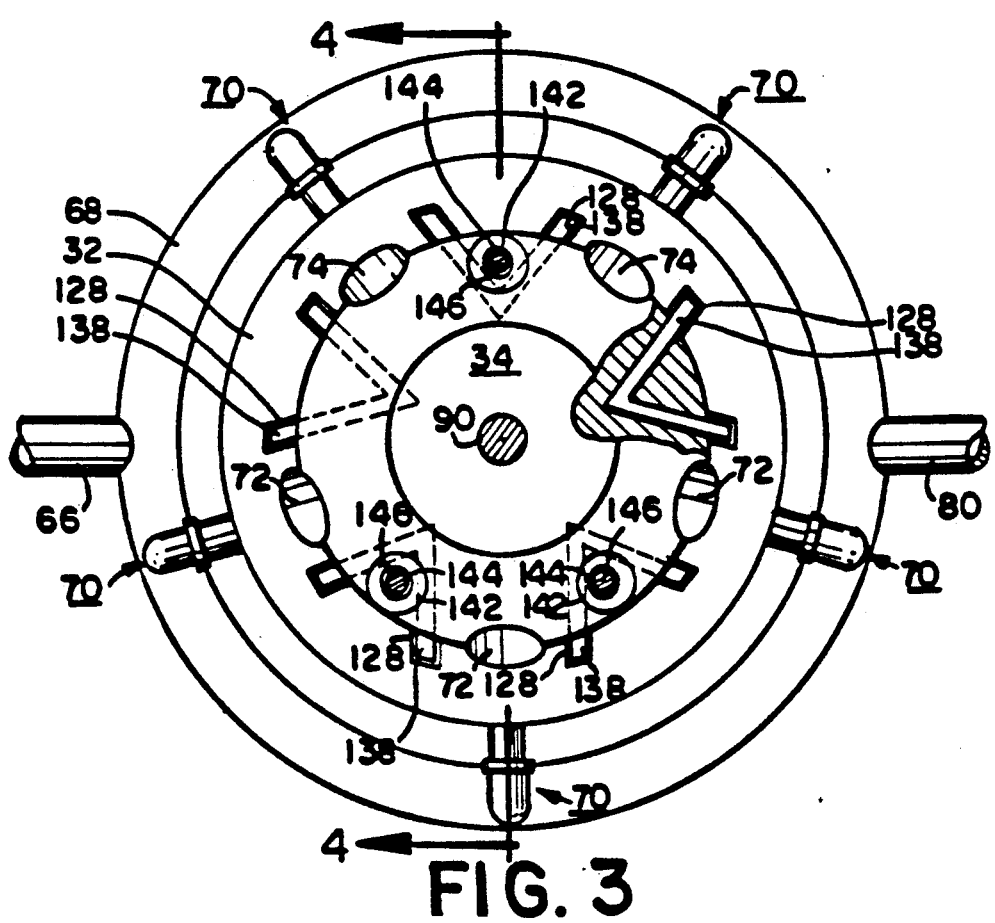
FIG. 3 is a top plan view, partly broken away, of the components of the present invention illustrated in FIG. 2.

A plurality of vertical, V-shaped guides 138 are cast or machined in the inverted conical surface of second section 34. Guides 138 travel within vertical, V-shaped guideways 128 formed in first, lower section 32 as best illustrated in FIGS. 2 and 3 and, especially, FIG. 5. The mating guides 138 and guideways 128 provide for proper alignment of lower channel halves 126 with upper channel halves 136.

As best illustrated in FIGS. 4 and 5, a plurality of machined, cast surfaces 140 extend between upper channel halves 136 and guides 138 to form surfaces for section 34 which abut complementary surfaces 130 of first section 32.

A plurality of raised bosses 142 are formed on the upper surface of second section 34. Guide rod bores 144 extend through raised bosses 142 completely through the second section and are aligned with threaded bores 132 formed in first section 32. Guide rod bores 144 have a slightly greater diameter than threaded bores 132 and guide rods 146 which extend through guide rod bores 144 and are threaded into threaded bores 132. Guide rods 146 maintain the proper alignment of the upper channel halves 136 with lower channel halves 126 when second section 34 is raised and lowered with respect to first section 32.

It is important to be able to raise and lower section 34 with respect to section 32. In the lowermost position illustrated in FIG. 4, where machined or cast surfaces 130 and 140 are in contact, channels 74 have their smallest diameter. Where the channels have their smallest diameter, the pressure of the mixture of oxygen-rich gas and sludge exiting from channels 74 is the greatest. However, due to the variable content and nature of sludge, it may be desirable to raise section 34 with respect to section 32 to allow for a greater volume of the gas-sludge mixture to be dispersed or, more commonly, to relieve blockages of the channels or to provide for cleaning of the combination mixing and dispersing assembly 30. Upper section 34 is raised by shaft 90 connected at one end by a threaded connection to a threaded bore 148 formed in section 34 and at the other end to the piston of hydraulic cylinder 100.

Fittings 70 connecting oxygen-rich gas manifold 68 to first section 32 will now be described in more detail with reference to FIGS. 2 and 4. Only one fitting will be described, since the others are substantially the same as the one described.

A connecting conduit 150 threaded at one end is welded, soldered or otherwise attached at the other end to manifold 68. The threaded end of conduit 150 is connected by a threaded union 152 to a connecting conduit 154 threaded at both ends. Conduit 154 is connected by a threaded elbow 156 to another threaded conduit 158. Threaded conduit 158 is connected by a threaded elbow 160 to still another threaded conduit 162. Threaded conduit 162 is screwed into a threaded lower portion 164 of bore 72 in raised boss 122 formed in inverted conical portion 120 of first section 32.

It can be seen that the oxygen-rich gas readily passes from manifold 68 through fittings 70 to bores 72. At the juncture of the bores 72 and channels 74, the oxygen-rich gas is mixed with the sludge. Since the oxygen-rich gas is pressurized and the sludge is pumped into combination mixing and dispersing assembly 30 so that it is also pressurized, the mixed gas and sludge are forcibly dispersed from channels 74 with the outer portions of the channels acting as nozzles to disperse the pre-oxygenated sludge throughout the upper portion of vessel 12 in the form of a plurality of streams of droplets.

The operation of reactor assembly 10 will now be described with particular reference to FIG. 1.

To initiate operation, sludge, which preferably has been acidified by addition of sulfuric acid or other suitable acid to a pH of about 2.5 to about 3, and preferably, about 2.7, is pumped into hyperbaric vessel 12 through sludge inlet 20. Pumping continues until the vessel is about half full to a level below the location of the combination mixing and dispersing assembly 30. The flow of oxygen-rich gas, which initially is preferably oxygen, is initiated through gas inlet 56, valve 58, conduits 60 and 66, manifold 68, fittings 70, bores 72 and channels 74. Sludge mixing pump 52 is activated to begin circulating and mixing the sludge in lower portion 18 of the vessel. Sludge delivery pump 26 is activated to pump sludge from lower portion 18 through the channels 74 of the combination gas and sludge mixing and dispersing assembly 30.

Oxygen and/or ozone is added and mixed with the sludge in assembly 30 until the pressure within the vessel reaches an appropriate value of about 45 psig to about 65 psig, and preferably, about 60 psig.

The continuous mixing and the continuous recirculation of the pH adjusted raw sludge is conducted for approximately 60 minutes. During this approximately 60-minute operation cycle, excess gas is vented from hyperbaric vessel 12 to maintain the desired gas pressure inside the vessel.

Where gas recirculation loop 166 is used, valve 188 is closed to stop substantially all gas from entering hyperbaric vessel 12. Gas is drawn from the upper portion 16 of hyperbaric vessel 12 through gas drying facility 172, conduit 178, valve 180 and T-connection 182 and is recirculated through combination gas and sludge mixing and dispersing assembly 30 back into the upper portion 16 of hyperbaric vessel 12. Oxygenation and dispersement of the sludge from the combination gas and sludge mixing and dispersing assembly causes a plurality of sludge streams 76 of the mixture to be dispersed against target plates 78 radially arranged on the upper wall of the vessel. Sludge streams 76 impact with target plates 78 to form great numbers of atomized sludge droplets 77 which are dispersed throughout upper portion 16 of hyperbaric vessel 12.

If desired, a combination of oxygen and/or ozone is used during oxygenating for about 30 minutes. The ozone is generated by any one of a number of commercially available ozone generators (not shown). Ozone is added through the same gas delivery means as the oxygen for about 60 minutes. The desired pressure, about 60 psig, is maintained in the upper portion of the hyperbaric vessel by opening bleed valve 112 where necessary. After the ozonation for about 60 minutes, the activation of sludge is complete.

Alternately, if desired, and as presently preferred, ozone is dispersed through appropriate inlet piping 198, 198' or 198" and the associated valves to combination gas and sludge mixing and dispersing assembly 30 as shown in FIG. 1 via static mixer devices 192 or 192', or through angled connection point 205 into sludge recirculation conduit 24. Oxygen-rich gas, which is a combination of oxygen and ozone (preferably about 3.5% to about 5% by weight ozone), is introduced into hyperbaric vessel 12 until a gas pressure of approximately 45 psig to approximately 65 psig, and preferably, until approximately 60 psig is reached. Preferably, the total dosage rate of ozone in the process is about 1 lb. of ozone per 1,000 gallons (about 569 g/1,000 liters) of sludge.

Mixing and recirculation of the oxygenated sludge within hyperbaric vessel 12 is continued at a rate of one turnover approximately every five minutes during the oxygenation/ozonation process.

Sludge mixing or recirculating pump 52 is then deactivated, as is sludge delivery pump 26.

It is believed that the treatment of the sludge with oxygen and ozone in the manner set forth above using the apparatus of the present invention will result in activated sludge in which the levels of bacteria and other pathogens show significant reductions according to acceptable governmental standards.

The parameters of operation will depend to some extent on the content and nature of the sludge being treated. It is well within the purview of those of ordinary skill in the art to adjust the parameters based on the disclosure provided herein to provide for the efficient oxygenation of sludge.

Figure 8:
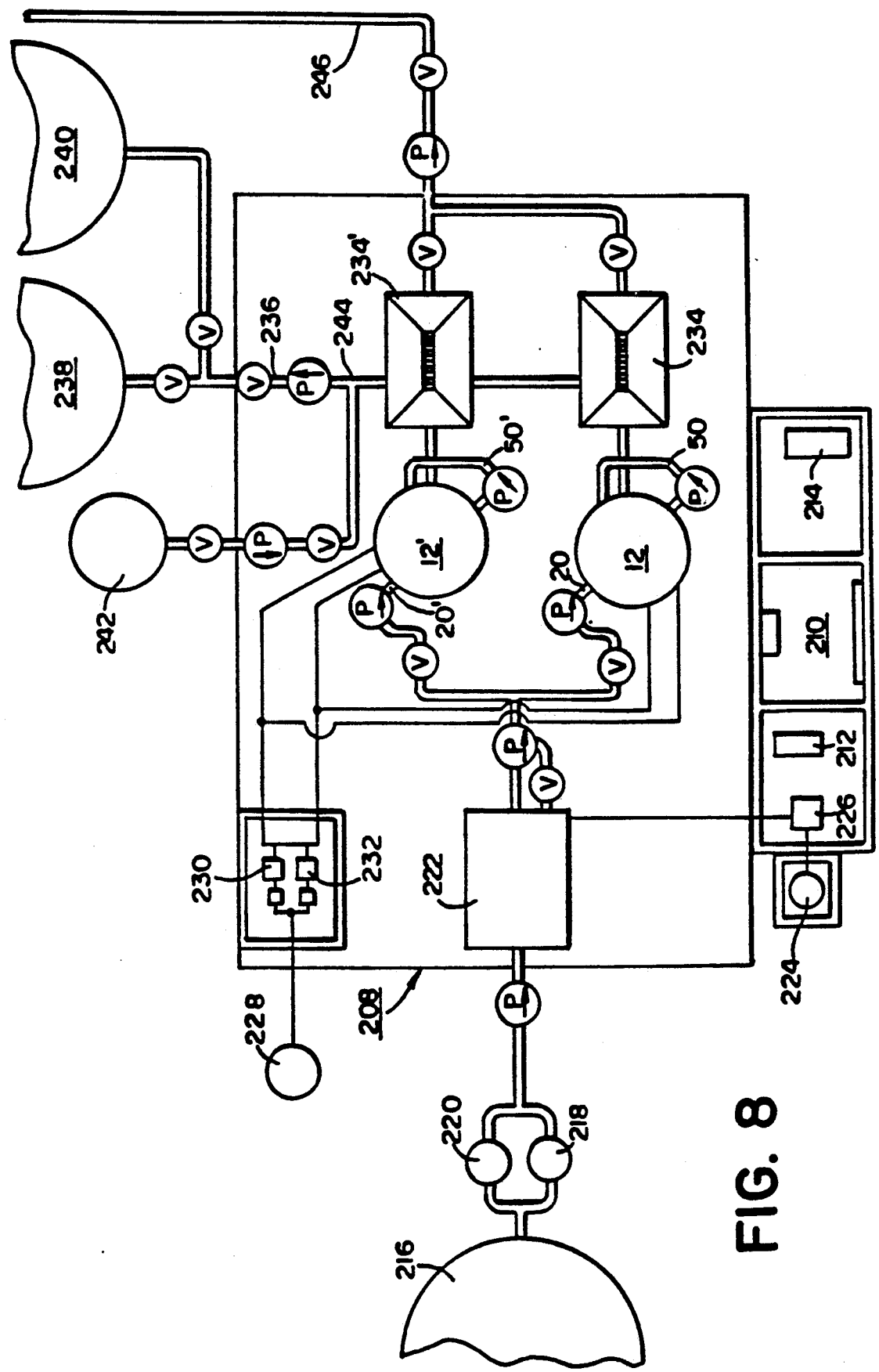
FIG. 8 is a top plan view, in schematic form, of a typical first stage sewage sludge treatment apparatus for producing a new sludge product in accordance with the present invention.

Referring to FIG. 8, a first stage sewage sludge treatment facility 208 is schematically illustrated. For ease of explanation, not every conduit, valve and pump is specifically numbered and referenced herein. One skilled in the art would readily appreciate and understand the interconnection and operation of the components described hereinafter.

A control facility 210 having computer control devices, semi-automatic control devices and manual remote-controlled devices, all of types well known to those skilled in the art, operate, monitor and control all operations of the entire sewage sludge treatment facility. Thus, the entire plant can be operated in an automatic (i.e., a computer controlled) mode, a semi-automatic mode or in a manual mode from control facility 210. The standard electrical connections, sensors, etc. associated with control facility 210 are not illustrated for the sake of making the schematic drawings of FIGS. 8 and 9 easier to understand. Such connections and auxiliary equipment are well known to those skilled in the art.

A water seal unit 212 provides a water seal to all pumps. Conduits to all of the pumps are not shown in the schematic drawings of FIGS. 8 and 9 for ease in understanding the drawings.

The facility preferably uses air activated valves and cylinders rather than hydraulic facilities to eliminate the potential hazard of an oxygen-oil combination. A compressed air source 214 is provided to furnish compressed air to the various remotely operated valves and lift cylinders associated with the components of facility 208. Again, for ease in understanding the drawings, the standard conduits connecting compressed air source 214 to the various components which are controlled by compressed air are not specifically illustrated.

A sewage sludge receiving tank 216 receives raw sludge. Concentrated or thickened raw sludge having a solids content of about 3% to about 4% is delivered to tank 216 from a sewage treatment plant. Preferably, sewage sludge receiving tank 216 will have sufficient capacity to provide a minimum of three days storage of the raw sludge produced and delivered to receiving tank 216 to accommodate the interface between the continuous operation of the sewage treatment plant of the present invention and the 40-hour per week operation of the batch operation of first stage sewage sludge treatment facility 208. The raw sludge is pumped through suitable piping and valves through sludge macerating equipment 218 and 220 into a pH adjust tank 222. The pH adjust tank 222 has heating means (not shown) to heat the pH adjusted sludge to a temperature between about 20° C. and about 40° C. which increases the rate and efficiency of oxygenation and/or ozonation reactions. Extensive tests have also shown that a sludge having a solids concentration of about 2.5% to about 4% solids increases the rate and efficiency of reactions of ozone with the sludge and reactions of the chemical additive with the sludge. The pH adjust tank further comprises means, such as a valved water inlet (not shown), for adding water to the raw sludge for modifying the solids content of the raw sludge to about 2.5% to about 4.0% and preferably to about 3.5% by weight. The raw sludge and acid are mixed to form pH adjusted raw sludge having a pH of about 2.5 to about 3 and preferably, about 2.7.

When the desired fill level of raw sludge in pH adjust tank 222 has been reached, appropriate signals from control facility 210 cause the filling of pH adjust tank 222 with raw sludge to stop. Similarly, appropriate signals from control facility 210 start the flow of acid, for example, sulfuric acid, from acid storage tank 224 through acid pump and metering facility 226 into pH adjust tank 222. Suitable, readily available odor control equipment (not shown) is preferably provided for the pH adjustment operation. After signals measuring the pH, solids content and temperature of the raw sludge to control facility 210 have indicated that the raw sludge has a desired pH, preferably about 2.7, a solids content of about 3.5% and a temperature within the indicated range, and preferably, about 30° C., the raw sludge has been converted to pH adjusted raw sludge and is ready for further processing.

Appropriate signals from control facility 210 stop the mixing of pH adjusted sludge in relation to tank 222. Signals are sent by control facility 210 to transfer the pH adjusted raw sludge from pH adjust tank 222 through suitable pumps, piping and valves to inlets 20 and 20' respectively of hyperbaric vessels 12 and 12'.

Signals from control facility 210 then activate oxygen control and metering equipment 230, thereby delivering a suitable amount of oxygen from an oxygen source, such as an oxygen tank 228 to ozone generating and metering equipment 232.

Oxygen and ozone are supplied through the indicated supply lines to the hyperbaric vessels 12 and 12' as described in detail above. The pH adjusted raw sludge is oxygenated, ozonated and further processed until the sludge is thoroughly treated as described above within hyperbaric vessels 12 and 12'.

After approximately 60 minutes of processing time, pH adjusted raw sludge becomes partially treated sludge, hereinafter referred to as "first stage treated sludge." Signals from control facility 210 stop the mixing pumps and recirculating pumps and turn off oxygen control and metering equipment 230 and ozone generating and metering equipment 232. After processing for approximately 60 minutes, the partially treated sludge is substantially completely atomized. The physical structure of the partially treated sludge comprises fine particles that are saturated with oxygen and ozone gas, with a pH of about 3.

Signals from control facility 210 control the transfer of the partially treated sludge from hyperbaric vessels 12 and 12' into rapid separation facilities 234 and 234', respectively. In the rapid separation facilities, more fully described in Long, Jr. U.S. Pat. No. 4,690,388, partially treated sludge is separated and converted into thickened first stage treated sludge and the remaining liquid portion of the sludge. First stage treated sludge is thickened to approximately 6% to 7% solids, saturated with oxygen-rich gas and comprises atomized fine particles, making the product easy to dewater. First stage treated sludge is also free from putrid and nuisance sludge odors, has significantly reduced pathogen levels, and is also bleached by the oxidizing process to a light brown or tan color. All of these properties serve to transform first stage treated sludge into a safe and acceptable product for further processing.

The liquid portion of the sludge is pumped by a suitable liquid pump through a valved conduit 246 to a precipitator (more fully described hereinafter with reference to FIG. 9). First stage treated sludge is pumped by a suitable high solids pump through concentrated solids sludge discharge conduit 236 and other suitable piping and valves to first stage treated sludge storage facilities 238 and 240, preferably on alternate days to assure a desired storage and retention time.

A chemical additive, for example, sodium nitrite ($NaNO_2$), preferably in the form of a liquid, and typically, an aqueous solution, is transferred from a chemical storage tank 242 by readily available chemical pumping and metering equipment into conduit 236 at junction 244, where the chemical additive is mixed with the previously treated sludge on its way into storage facilities 238 and 240.

The chemical additive is preferably mixed with first stage treated sludge in an amount sufficient to achieve the desired additional pathogen kill. Sodium nitrite has been found to be particularly effective at killing viruses, as well as the other organisms referred to hereinbefore. Extensive research has shown that the effectiveness of sodium nitrite is determined by the sludge pH, sludge temperature, concentration of sludge solids and prior oxygenation of the sludge. Laboratory tests conducted on sludge according to the present invention using sodium nitrite as the chemical additive significantly reduced the total bacterial count, the bacterial count of fecal coliform, spores of *Clostridium perfringens*, as well as poliovirus-Type I and Ascaris which was added to some of the laboratory test samples of sludge.

Although the presently preferred chemical additive for carrying or substantially reducing viruses and other pathogens in the sludge to below detectable levels or at least to acceptable levels, based on current government standards, is sodium nitrite, it is believed that other nitrite salts, such as potassium nitrite for example, may be used if desired and depending on the type of pathogen present in the sludge. A preferred concentration range of sodium nitrite, on a dry weight basis of sodium nitrite, is a ratio of about 0.5 gram to about 1.5 grams of sodium nitrite to about one liter of first stage treated sludge. Presently the most preferred ratio is about one gram of sodium nitrite to about one liter of first stage treated sludge.

After about two hours of storage and retention time of the mixture of chemical additive and first stage treated sludge in storage facilities 238 and 240, the mixture of first stage treated sludge and chemical additive has now become second stage treated sludge. It is believed that the second stage treated sludge will qualify for the designation "PFRP" by the U.S. Environmental Protection Agency.

Figure 9:
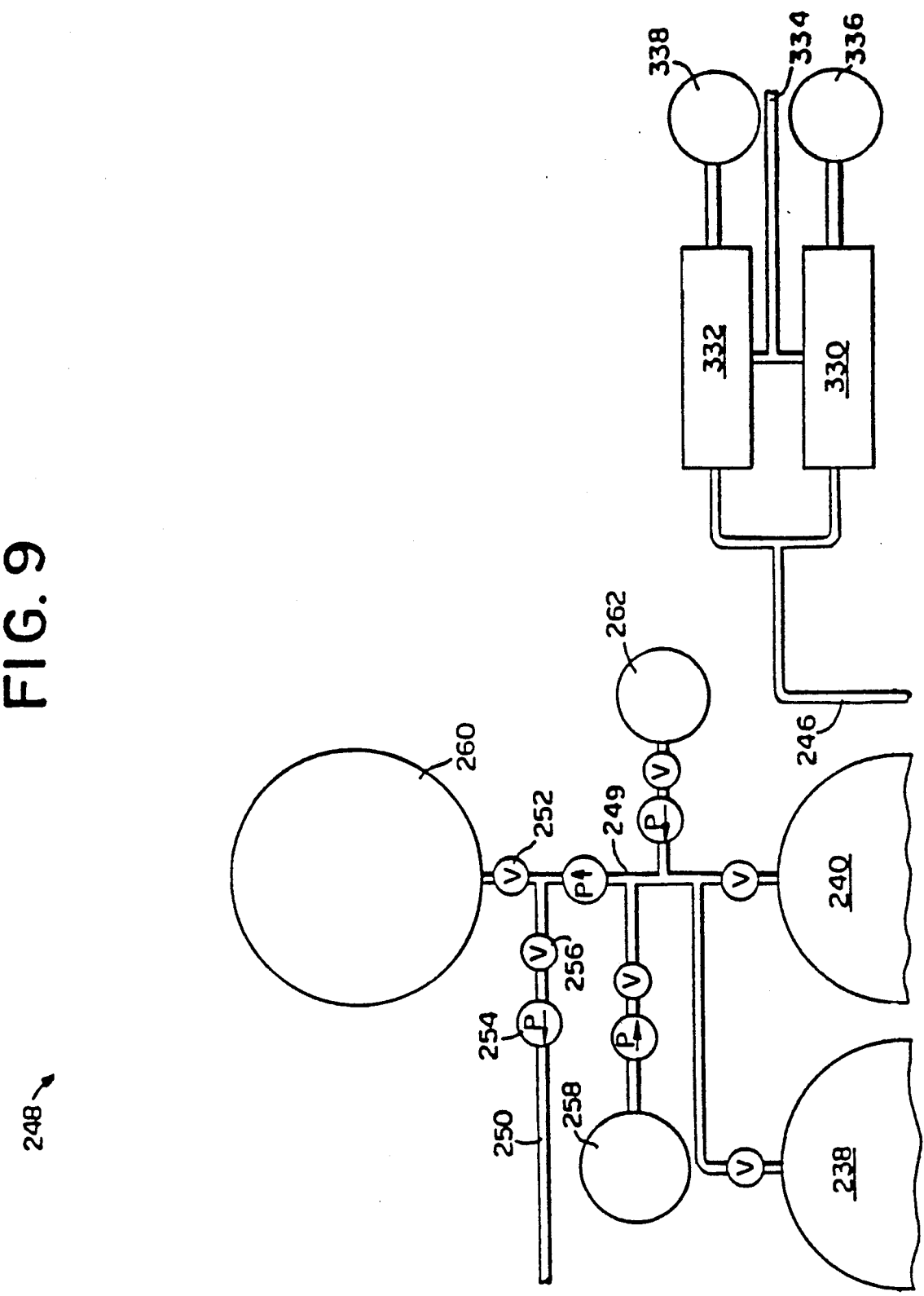
FIG. 9 is a top plan view, in schematic form, of additional aspects of the sewage treatment.

In accordance with the present invention, second stage treated sludge may be further processed in second stage sludge treatment facility 248 as set forth in FIG. 9. As previously indicated, prior to becoming second stage treated sludge, first stage treated sludge was thickened by rapid separation to comprise approximately 6% to 7% solids. In addition, through the gas injection processing, the second stage treated sludge is readily dewaterable.

If the second stage treated sludge is to be applied to land, for example, as a liquid fertilizer, the second stage treated sludge may be pumped from either or both of first stage treated sludge storage facility 238 and/or 240 by a sludge pump through a sludge transfer conduit 249 into a liquid sludge discharge conduit 250 and through suitable piping and valves into further holding tanks or tanker trucks to be transported to the application site. In this instance, a valve 252 in sludge transfer conduit 249 is closed, a pump 254 is activated and a valve 256 in liquid sludge discharge conduit 250 is opened, allowing the second stage treated sludge to be pumped from storage facility 238 and/or 240 through liquid sludge discharge conduit 250.

If it is desired to further treat the second stage treated sludge before the sludge is discharged through discharge conduit 250 or before the sludge is pumped into a second stage treated sludge mixing facility 260, such further treatment may proceed as follows.

As illustrated in FIG. 9, a lime slurry is pumped from a lime slurry storage tank 258 by suitable pumping and metering apparatus through the usual piping and valves into sludge transfer conduit 249. In this manner, second stage treated sludge is mixed with a suitable amount of a slurry of lime (calcium oxide, CaO) in water to provide a mixture having an adjusted pH of about 7. If desired, any other suitable neutralizing agent may be used, such as sodium hydroxide (NaOH) or magnesium hydroxide ($Mg(OH)_2$), for example, instead of a lime slurry.

In the event second stage treated sludge is to be further processed into sludge cake, second stage treated sludge is pumped from first stage treated sludge storage facilities 238 and/or 240 through sludge transfer conduit 249 using suitable piping or valves into a second stage sludge mixing facility 260. Concurrently, a desired amount of a polymeric binder may be pumped from polymer storage tank 262 via suitable pumping and metering apparatus through suitable piping and valves into second stage treated sludge mixing tank 260 where the polymer is mixed with the second stage treated sludge.

The polymeric binder, sometimes referred to herein as the "polymer", may be any of those organic polyelectrolytes used as sludge conditioning or flocculating agents which, therefore, function to cause the particles of sludge to bind to each other after various chemical reactions with the polymers. The action of such organic polyelectrolytes are known to those skilled in the art and are discussed, for example, in *Sludge Conditioning, Manual of Practice No. FD*-14, prepared by the Task Force On Sludge Conditioning, Water Pollution Control Federation, pp. 53–90 (1988); and *Operation And Maintenance of Sludge Dewatering Systems Manual of Practice No. OM*-8, Water Pollution Control Federation, (1987).

In general, these type of polymeric binders condition sludge in a complex process of destabilizing particles of various sizes by charge-neutralization and flocculation. The polymeric binders are broadly categorized to include cationic, anionic or nonionic polymers.

Cationic polymers include, for example, polyamines, polyethylimines, polyimidamines, polybutadienes, polyamidamines, polyquaternaries and substituted polyacrylamides.

Anionic polymers include, for example, polyacrylates, carboxylic polymers and modified and substituted polyacrylamides.

Nonionic polymers most common in commercial use are polyglycidyl polymers and polyacrylimides. Suitable specific polymeric binders may be readily determined with reference to any particular sludge by screening the particular sludge involved in bench-scale tests well known to those skilled in the art to determine which type of polymeric binder is best suited for the type of sludge being treated. Suitable polymers are manufactured by companies such as Allied Colloids, Inc., Nalco Chemical Co., Callaway Chemical Co., American Cyanamid Co. and Hercules, Inc., for instance. Presently preferred examples of suitable polymers are Nalco Chemical Co. Product Nos. 7763 or 8469, Callaway Chemical Co. Product No. 4473, American Cyanamid Co. SUPERFLOC® No. 2535C and Hercules, Inc. HERCOFLOC® No. 1018.

The amount of polymeric binder to be used in accordance with the present invention may range from about 0.1 to about 20 lbs. of polymer per ton (about 44 grams to about 9 kg of polymer per metric ton) of sludge based on the dry weight of sludge. Preferably, the polymer is present in an amount of about 2 to about 10 lbs. per ton (about 893 grams to about 4.5 kg per metric ton) of dry sludge solids. The amount of polymeric binder may be readily determined by field trials, without undue experimentation.

The polymer and sludge mixture will be dewatered using commercially available equipment, such as a belt press, to produce the sludge cake. The sludge cake itself is suitable for application to the land as a fertilizer or used in a landfill, for example.

The liquid portion of the first stage treated sludge is pumped from the rapid separation facilities 234 and 234' (FIG. 8), through liquid conduit 246 and suitable piping and valves into precipitators 330 and 332. In precipitators 330 and 332, suitable chemicals, such as lime or aluminum oxide, are added to separate the sludge liquid portion into finished liquid portion and precipitated chemical compounds. The pH adjustment of the process makes the precipitation of solids from the liquid side stream economically viable. The precipitators remove chemical compounds which may have formed by the reaction of various heavy metals with the acid in the pH adjusted sludge. The finished liquid portion is pumped through finished liquid conduit 334 to a waste water treatment plant (not shown). The precipitated chemical compounds are delivered from precipitators 330 and 332 to storage facilities 336 and 338 via respective conveyors.

The present invention may be embodied in other specific forms without departing from the spirit or essential attributes thereof and, accordingly, reference should be made to the appended claims, rather than to the foregoing specification as indicating the scope of the invention.

We claim:

1. Apparatus for use in a sewage sludge treatment system comprising means to enhance the treatment of the sludge with oxygen-rich gas including
    a hyperbaric vessel having sludge inlet means for conveying the sludge to the vessel to be accumulated in a lower portion thereof,
    a combination mixing and dispersing means having a plurality of channels and supported within an upper portion of the vessel for mixing the sludge and oxygen-rich gas and for dispersing a mixture of sludge and oxygen-rich gas throughout the upper portion of the vessel in a plurality of streams,
    a sludge delivery means comprising a pump associated with a conduit, the conduit being attached to the combination mixing and dispersing means for delivering sludge from the bottom portion of the vessel to the combination mixing and dispersing means,
    a first gas delivery means for delivering oxygen-rich gas to the combination mixing and dispersing means, including a first oxygen-rich gas inlet for delivering gas directly to the combination mixing and dispersing means, a sludge mixing means comprising a conduit connected at opposite ends to the hyperbaric vessel and a pump externally of the hyperbaric vessel for pumping the mixture of sludge and oxygen-rich gas out of and back into the hyperbaric vessel, a second gas delivery means including a second oxygen-rich gas inlet for delivering oxygen-rich gas to one of the sludge delivery means and the sludge mixing means for additionally adding oxygen-rich gas to the sludge, a sludge outlet means for removing the oxygenated sludge from the lower portion of the vessel, and gas outlet means for removing gas from the upper portion of the vessel.

2. The apparatus of claim 1 wherein the second gas delivery means comprises a second oxygen-rich gas inlet conduit in fluid communication with the conduit of the sludge mixing means.

3. The apparatus of claim 1 wherein the second gas delivery means comprises a second oxygen-rich gas inlet conduit in fluid communication with the conduit of the sludge delivery means.

4. The apparatus of claim 3 wherein the second gas inlet conduit is connected to the conduit of the sludge delivery means at a point external of the hyperbaric vessel.

5. The apparatus of claim 3 wherein the second gas inlet conduit is connected to the conduit of the sludge delivery means at a point within the hyperbaric vessel.

6. The apparatus of claim 1 further comprising a gas recirculating means for recirculating gas from and to the upper portion of the hyperbaric vessel.

7. The apparatus of claim 6 wherein the gas recirculating means comprises a valved recirculation conduit in fluid communication with the upper portion of the vessel, a gas drying means in fluid communication with the recirculation conduit, a gas pump for pumping gas through the recirculation conduit, and means connecting the recirculation conduit with the first oxygen-rich gas inlet.

* * * * *